United States Patent
Ebara et al.

(10) Patent No.: US 7,711,046 B2
(45) Date of Patent: May 4, 2010

(54) ENCODING CIRCUIT

(75) Inventors: Masami Ebara, Kobe (JP); Osamu Takae, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 1385 days.

(21) Appl. No.: 11/112,737

(22) Filed: Apr. 22, 2005

(65) Prior Publication Data

US 2005/0243918 A1  Nov. 3, 2005

(30) Foreign Application Priority Data

Apr. 22, 2004 (JP) ............................ 2004-127147
Nov. 16, 2004 (JP) ............................ 2004-332082

(51) Int. Cl.
*H04B 1/66* (2006.01)
*H04N 7/12* (2006.01)

(52) U.S. Cl. .................................. 375/240.03
(58) Field of Classification Search ................
375/240.03–240.17, 240.23, 240.24, 240.18;
382/232, 234, 236; *H04N 7/12; H04B 1/66*
See application file for complete search history.

(56) References Cited

U.S. PATENT DOCUMENTS

| | | | | |
|---|---|---|---|---|
| 5,701,160 A * | 12/1997 | Kimura et al. | ......... | 375/240.14 |
| 5,815,602 A * | 9/1998 | Ueda et al. | ................. | 382/236 |
| 5,970,172 A | 10/1999 | Mochizuki | | |
| 6,097,843 A | 8/2000 | Takashima et al. | | |
| 6,348,945 B1 * | 2/2002 | Hayakawa | ............. | 375/240.18 |
| 6,625,216 B1 * | 9/2003 | Zhu | ....................... | 375/240.16 |
| 2007/0127577 A1 * | 6/2007 | Tourapis et al. | ........ | 375/240.16 |
| 2007/0171978 A1 * | 7/2007 | Chono | .................... | 375/240.18 |
| 2007/0237226 A1 * | 10/2007 | Regunathan et al. | ... | 375/240.12 |
| 2007/0237232 A1 * | 10/2007 | Chang et al. | ........... | 375/240.16 |
| 2008/0117978 A1 * | 5/2008 | Kapasi et al. | .......... | 375/240.16 |
| 2008/0298466 A1 * | 12/2008 | Liu | ....................... | 375/240.24 |

FOREIGN PATENT DOCUMENTS

| | | |
|---|---|---|
| JP | 2574312 | 1/1989 |
| JP | 8-084337 A | 3/1996 |
| JP | 2827997 | 7/1997 |
| JP | 2002-073588 | 3/2002 |

(Continued)

OTHER PUBLICATIONS

Chinese Office Action for Chinese Application No. 2005100666598, mailed on Feb. 27, 2009 (8 pages).

(Continued)

*Primary Examiner*—Tung Vo
(74) *Attorney, Agent, or Firm*—Osha • Liang LLP (57) ABSTRACT

Blocks in two different frames are subjected to Hadamard transform by first and second Hadamard transform circuits, and a sum component and a difference component are calculated for the components of the two blocks corresponding to each other to perform three-dimensional Hadamard transform, so that detection is made as to whether or not these blocks include a motion. While the sum component and the difference component are encoded for the block determined as including a motion, a motion detection result, rather than the difference component, is encoded for the block determined as including no motion. As a result, a high compression ratio can be achieved in video encoding with a small-scale circuit.

8 Claims, 7 Drawing Sheets

FOREIGN PATENT DOCUMENTS

KR    10-2000-76522 A    12/2000

OTHER PUBLICATIONS esp@cenet Patent Abstract for Korean Application No. 10-2000-76522, publication date Jun. 22, 2002. (1 page).

esp@cenet Patent Abstract for Japanese Publication No. 8-084337, publication date Mar. 26, 1996. (1 page).

Korean Office Action for Application No. 10-2005-33096, mailed on Aug. 30, 2006 (4 pages).

Japanese Office Action for Application No. 2004-332082, mailed on Sep. 8, 2009 (4 pages).

* cited by examiner

MOVING IMAGE

------------------------------- R2

QUASI-MOVING IMAGE

------------------------------- R1

STILL IMAGE

Fig. 6

| DETERMINATION | Q ||
|---|---|---|
| | SUM COMPONENT | DIFFRENCE COMPONENT |
| STILL IMAGE | Q=32 | NO TRANSMISSION |
| QUASI-MOVING IMAGE | Q=64 | Q=64 |
| MOVING IMAGE | Q=128 | Q=128 |

Fig. 7

ENCODING CIRCUIT

CROSS-REFERENCE TO RELATED APPLICATIONS

The entire disclosure of Japanese Patent Application Nos. 2004-332082 and 2004-127147 including specification, claims, drawings, and abstract is incorporated herein by reference.

BACKGROUND OF THE INVENTION

1. Field of the Invention

The present invention relates to an encoding circuit for achieving a high compression ratio in encoding video signals.

2. Description of the Related Art

The MPEG technique, one of the commonly employed conventional encoding techniques, is based on the principal of orthogonal transformation through inter-frame prediction coding and DCT (discrete cosine transform) and utilizes motion vectors to strengthen correlation between frames, thereby improving prediction accuracy and further enhancing the compression ratio. Another compression method for a DVC (digital video cassette) is based on DCT and an encoding method in which groups of encoding blocks are provided and such groups are combined to average the overall amount of generated codes (DV format). Other techniques include DPCM (differential pulse code modulation) and prediction coding. Further, Hadamard transform is also known as another encoding method.

However, as can be imagined from the basic principle thereof, both the MPEG and DV formats require a large encoding circuit, while other techniques which do not require large scale encoding circuits, such as DPCM and prediction coding, cannot be expected to achieve a high compression ratio.

SUMMARY OF THE INVENTION

The present invention according to one aspect provides an encoding circuit comprising a first Hadamard transform circuit for performing Hadamard transform on a block having "m" dots×"n" lines in a first frame, a second Hadamard transform circuit for performing Hadamard transform on a corresponding block having "m" dots×"n" lines in a subsequent second frame, means for calculating a sum component and a difference component for each component of a Hadamard transform result of the block in the first frame and a Hadamard transform result of the relevant block in the second frame to perform a process resulting in three-dimensional Hadamard transform, motion detecting means for detecting whether or not the block includes a motion, and means for encoding the sum component and the difference component for the block when it is determined that the block includes a motion, and encoding a motion detection result, instead of encoding the difference component, for the block when it is determined that the block includes no motion.

The present invention according to another aspect provides an encoding circuit for receiving a video signal for each frame in a time sequence, and compressing and supplying the video signal comprising a first Hadamard transform circuit for performing Hadamard transform on a block contained in a first frame, a second Hadamard transform circuit for performing Hadamard transform on a block contained in a second frame received prior to the first frame and corresponding to the block subjected to the process performed by the first Hadamard transform circuit, an adder for adding output values supplied from the first and second Hadamard transform circuits, a subtractor for performing subtraction on the output values supplied from the first and second Hadamard transform circuits, a motion detecting unit for detecting a change over time of the video signal of the block subjected to the process performed by the first Hadamard transform circuit, and an encoding unit for encoding a sum component from the adder and a difference component from the subtractor for the block when the motion detecting unit determines that the block includes a motion, and encoding a motion detection result, instead of the difference component, for the block when the motion detecting unit determines that the block includes no motion.

DESCRIPTION OF PREFERRED EMBODIMENT

A preferred embodiment of the present invention will now be described with reference to FIGS. 1-7.

Figure 1:
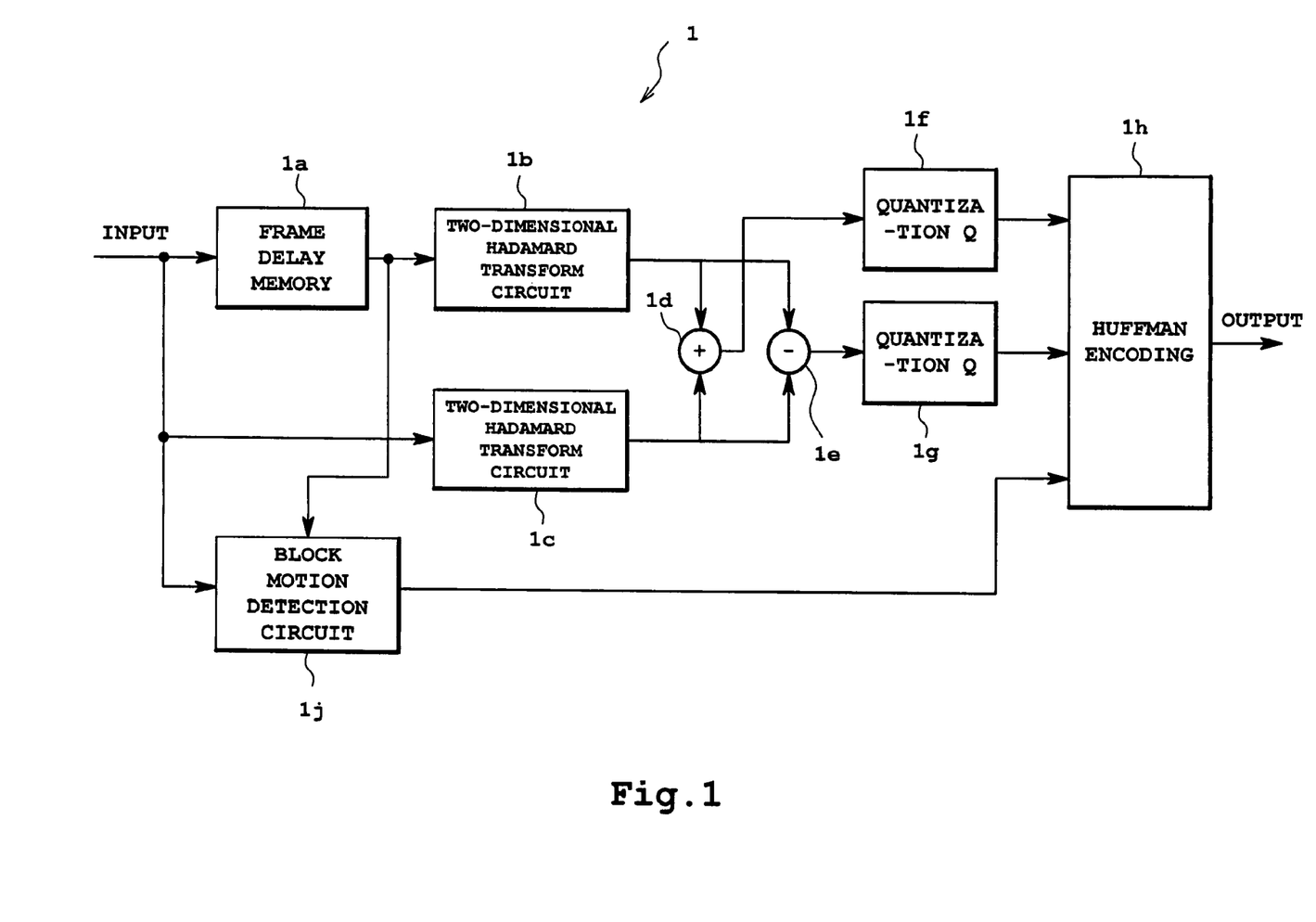
FIG. 1 is a block diagram showing an encoding circuit according to an embodiment of the present invention.

FIG. 1 is a block diagram showing an encoding circuit 1. A video signal supplied thereto is a digitized video signal (such as luminance/color-difference signals or RGB signals). A first Hadamard transform circuit 1b of the encoding circuit 1 receives the video signal delayed via a frame delay memory 1a, while a second Hadamard transform circuit 1c directly receives the video signal without being routed through the frame delay memory 1a.

The Hadamard transform circuits 1b and 1c divide the supplied video signal into blocks of a predetermined size, and calculate a two-dimensional Hadamard transform component for each block. The operation performed here is an operation for a Hadamard matrix having the rows (m) and the columns (n), and each component of the matrix will be either +1 or −1. For example, when each video signal is divided into a block of "m" rows and "n" columns, the number of components produced by two-dimensional Hadamard transform will be "m×n". For example, when m=2 and n=2, four components are provided. It is assumed herein that the components for a signal without a frame delay are labeled with $S(0)$ to $S(m \times n-1)$, and that the components with a frame delay are labeled with $FS(0)$ to $FS(m \times n-1)$.

The Hadamard transform components calculated by Hadamard transform circuits 1b and 1c are supplied to an adder 1d and a subtractor 1e. For each corresponding block of each video signal, the adder 1d and the subtractor 1e perform addition and subtraction on the Hadamard transform components as follows:

$$\text{adder} = S(k) + FS(k) \quad \text{(Equation 1)}$$

$$\text{subtractor} = S(k) - FS(k) \quad \text{(Equation 2)}$$

Quantization units $1f$ and $1g$ perform a quantization process on the results of addition and subtraction with a quantization step Q. The results of quantization are linked to each other in a one-dimensional arrangement, and provided to a Huffman encoding circuit $1h$. The circuit $1h$ performs the well-known Huffman encoding process, and a particular process directed by a signal from a block motion detecting circuit $1j$ described hereinafter. In a stage succeeding to the Huffman encoding circuit $1h$, an unillustrated transmission unit or the like is provided. When the encoding circuit 1 is provided in, for example, a television receiving device, a received program can be transmitted from the transmission unit. A sub television device attached to the television receiving device receives a signal transmitted from the transmission device, and performs a demodulation process and a decoding process to display a video image.

Figure 2:
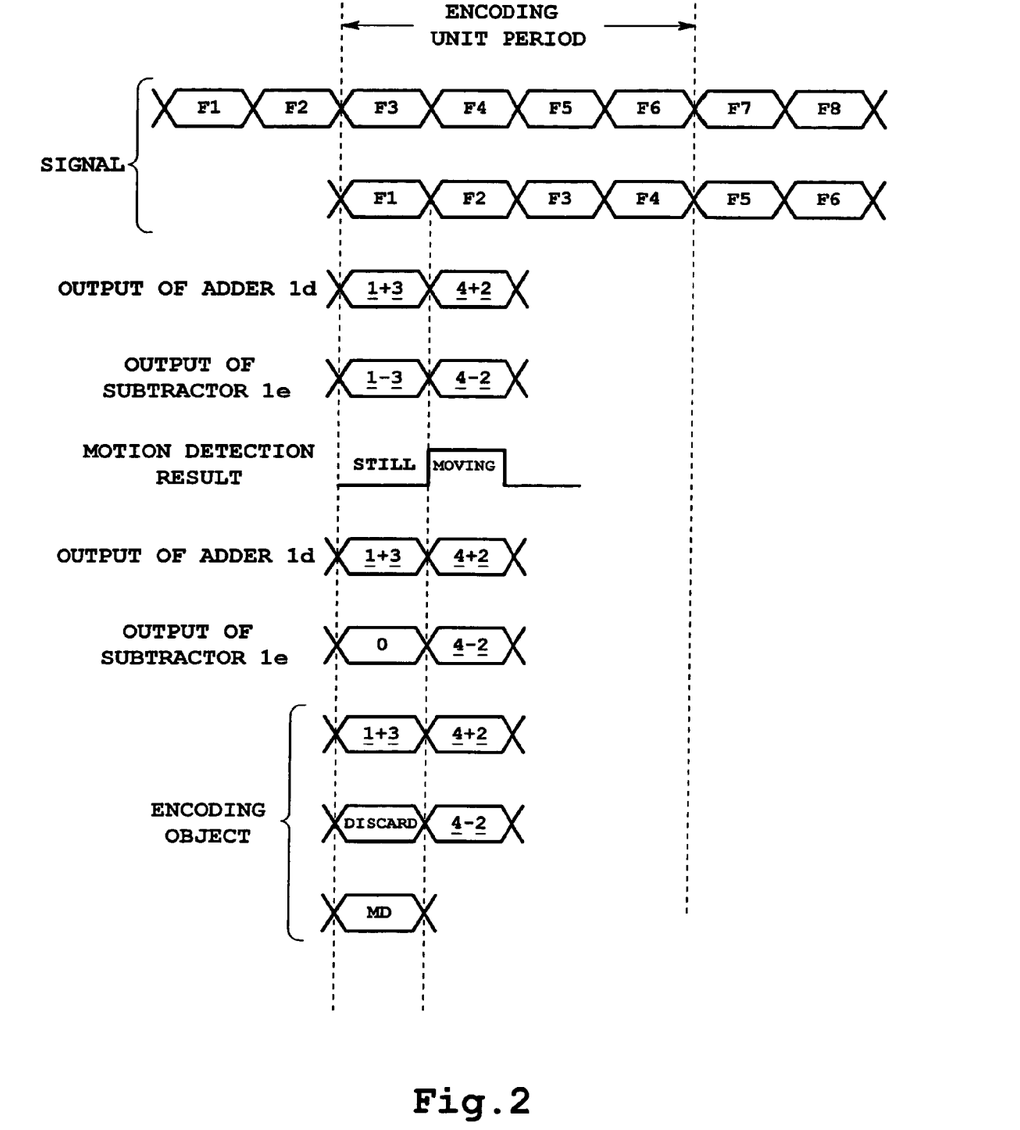
FIG. 2 is a diagram for describing an encoding unit period.

The above-described encoding circuit 1 uses two frame periods (corresponding to four field periods in the NTSC interlace system) of the video signal for an encoding unit period. More specifically, as shown in FIG. 2, for the signals with and without a frame delay, a first field F1 and a third field F3 correspond to each other. The corresponding blocks of the both fields are subjected to Hadamard transform, and the above-described addition and subtraction are performed. Similarly, a second field F2 and a fourth field F4 correspond to each other. The corresponding blocks of the both fields are subjected to Hadamard transform, and the above-described addition and subtraction are performed. In FIG. 2, the values produced by Hadamard transform are indicated by the underlined numbers.

Assuming that the input image is a static image, the result of subtraction in the equation 2 will be zero. This indicates that the total number of "m×n" components having the value zero are present, rather than the measure of the information has become zero.

The block motion detecting circuit $1j$ detects motion in a block. More specifically, referring to FIG. 3, for corresponding blocks of two fields subjected to Hadamard transform, average values $A_0$, $A_F$ are calculated by dividing the sum of P (P=vertical (y) pixels×horizontal (x) pixels) luminance values by the value P. The block motion detecting circuit $1j$ determines that, when the absolute value $|A_0-A_F|$ of a difference between the average values lies within a predetermined range, there is no motion in the block, while it determines that there is motion in the block when the absolute value $|A_0-A_F|$ of the difference is outside the predetermined range. The circuit $1j$ supplies the determination result to the Huffman encoding circuit $1h$. For example, with a pixel value ranging from 0 to 255, a difference between averages (MD) of four or greater is determined as detecting a motion.

Figure 3:
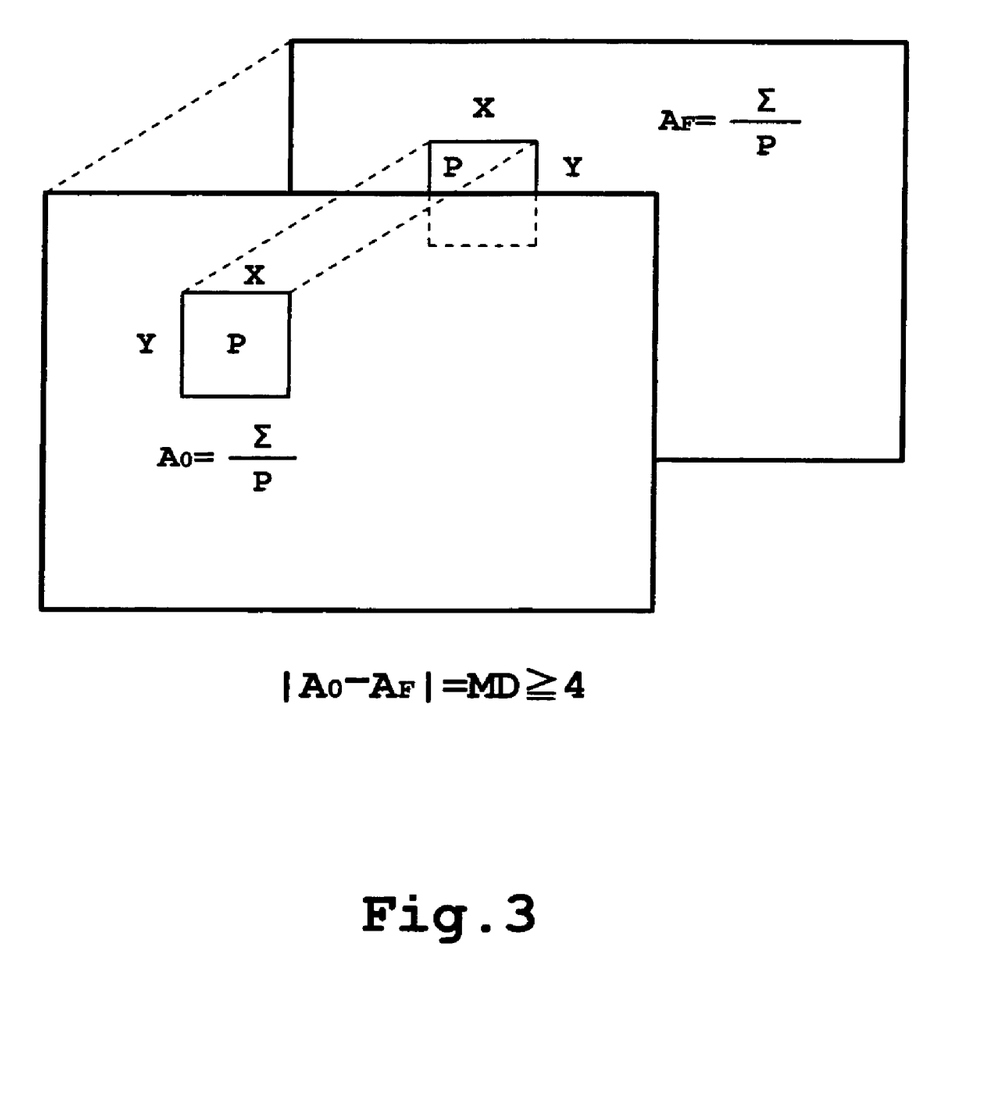
FIG. 3 is a view for describing a principle of motion detection according to the embodiment of the present invention.

It is also preferable to calculate the sums $S_0$, $S_F$ of, for example, P (P=vertical (y) pixels×horizontal (x) pixels) luminance values for corresponding blocks of two fields subjected to Hadamard transform. The block motion detecting circuit $1j$ determines that, when the absolute value $|S_0-S_F|$ of a difference between the sums lies within a predetermined range, there is no motion in the block, while it determines that there is a motion in the block when the absolute value $|S_0-S_F|$ of the difference is outside the predetermined range. The circuit $1j$ supplies the determination result to the Huffman encoding circuit $1h$.

The process for detecting a motion in blocks performed in the block motion detecting circuit $1j$ is not limited to the above-described process. Any process can be employed as long as a motion in a moving picture can be detected based on a change in image between corresponding blocks.

When the Huffman encoding circuit $1h$ receives from the block motion detecting circuit $1j$ the determination result indicating a motion, it performs an ordinary process (process of encoding addition/subtraction results). On the other hand, when it receives from the block motion detecting circuit $1j$ the determination result indicating no motion, the circuit $1h$ encodes and transmits a motion detection signal MD. In other words, for a still image or a still portion of an image, the motion detection signal MD, rather than each component value of the equation 2, is encoded and transmitted, thereby reducing the amount of transmitted codes.

Figure 4:
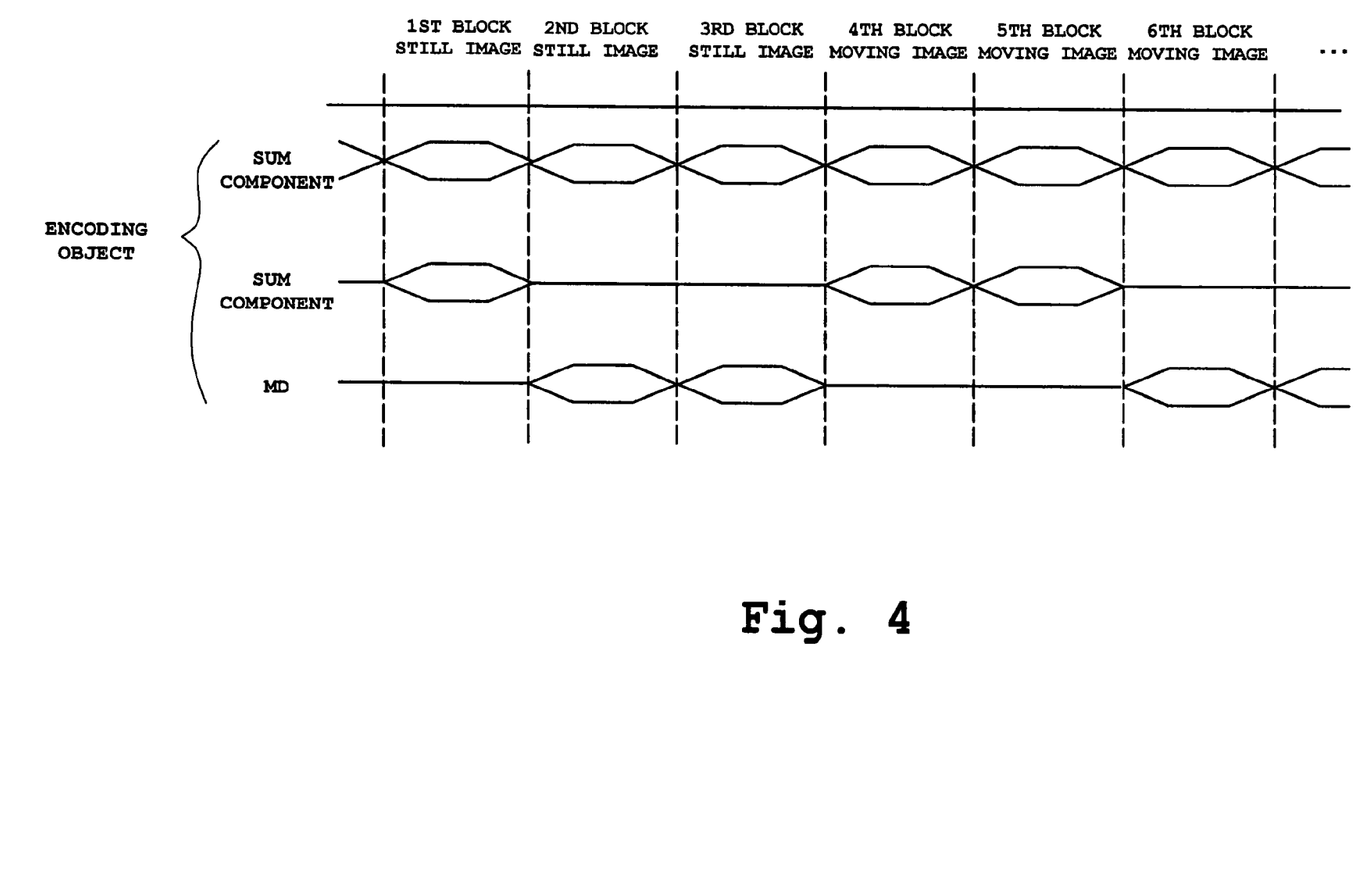
FIG. 4 is a diagram for describing an encoding process according to the embodiment of the present invention.

More specifically, a difference component of the block determined as a still block is discarded, and the motion detection signal MD is encoded. For example, as shown in FIG. 4, when a still image/moving image determination is made for each block and an image in a block is determined as stationary, the value output from the subtractor is discarded, and instead the motion detection signal MD is encoded and supplied. An encoded output bit of the motion detection signal MD is composed of 1 or more bits, and can be inserted after the bit (8 bits, for example) indicating a DC coefficient of the sum component of the equation 1.

In the sub television device, upon decoding, determination can be made as to whether the difference component is directly transmitted or the motion detection signal MD (information indicating a still image) is transmitted by noticing the bit after the bit string of the DC coefficient of the sum component. When the motion detection signal MD (information indicating a still image) is added, the device itself can produce "m×n" components having the value of zero, and perform the process using the produced components as the difference components.

Figure 5:
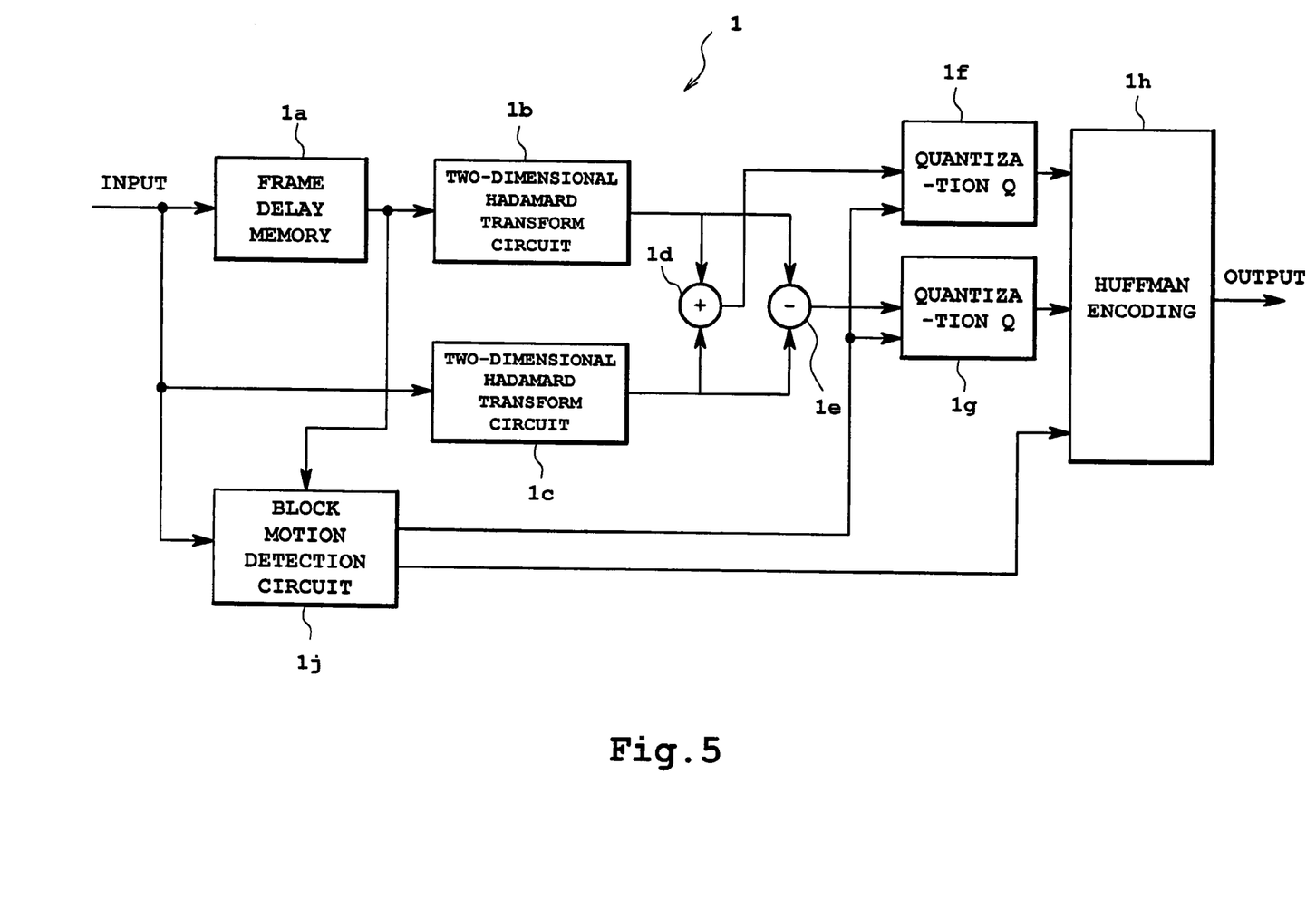
FIG. 5 is a block diagram of an encoding circuit according to a modification of the embodiment of the present invention.

As a modification, the quantization step Q can be varied for quantization based on the result of block motion detection provided by the block motion detecting circuit $1j$. FIG. 5 is a block diagram showing an encoding circuit 2 according to the present modification.

Figure 6:
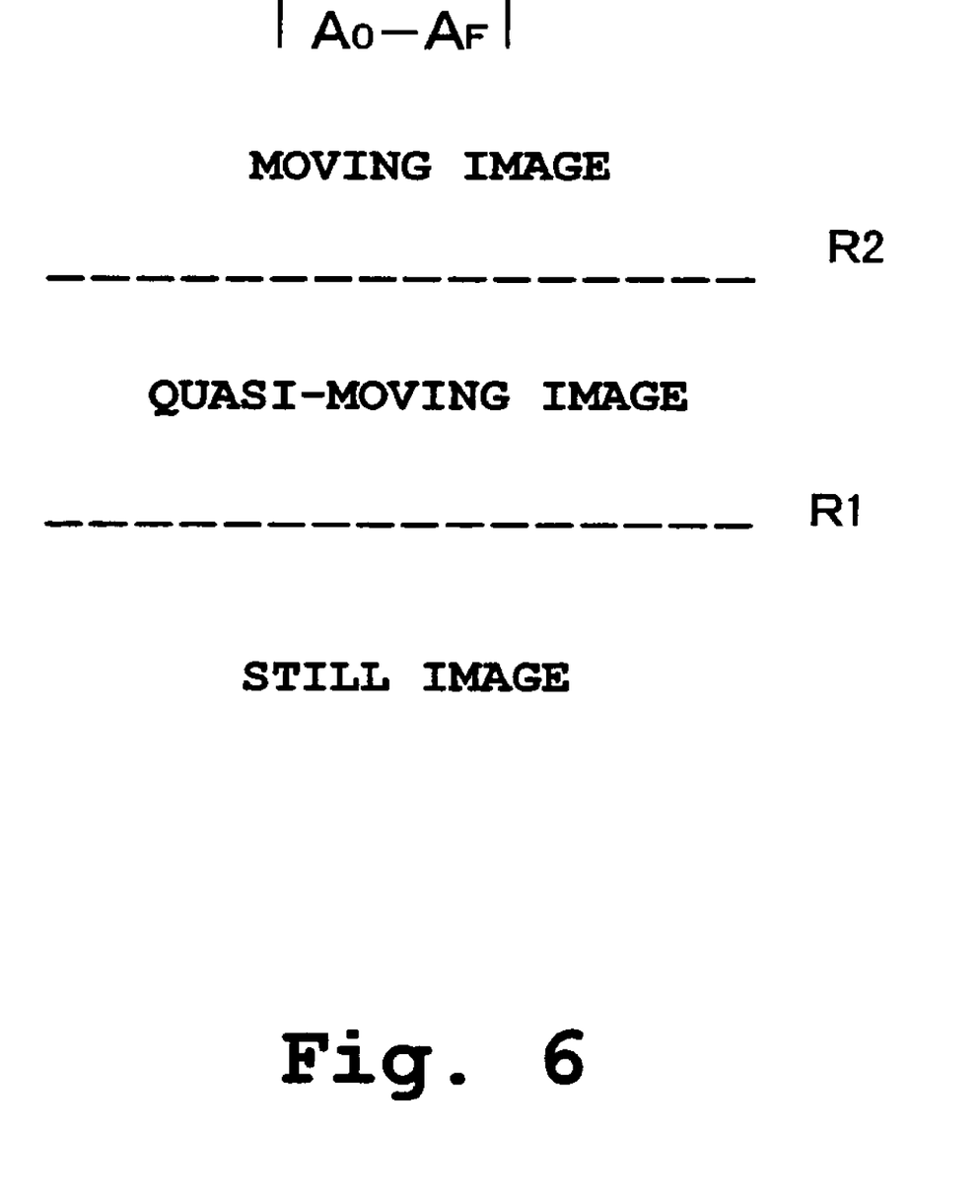
FIG. 6 is a diagram for describing a principle of motion detection in the modification of the embodiment of the present invention.

By way of example, two thresholds R1 and R2 (R2>R1) for motion detection are preset in the block motion detecting circuit $1j$, and, as shown in FIG. 6, it is determined that a block of interest includes a still image when the absolute value $|A_0-A_F|$ of the difference between the average values equals to, or smaller than, the first threshold R1, that the block includes a quasi-moving image when the absolute value $|A_0-A_F|$ of the difference between the average values is larger than the first threshold R1 and equals to, or smaller than, the second threshold R2, or that the block includes a moving image when the absolute value $|A_0-A_F|$ of the difference between the average values is larger than the second threshold R2. The determination result is provided to the quantization units $1f$ and $1g$.

Figure 7:
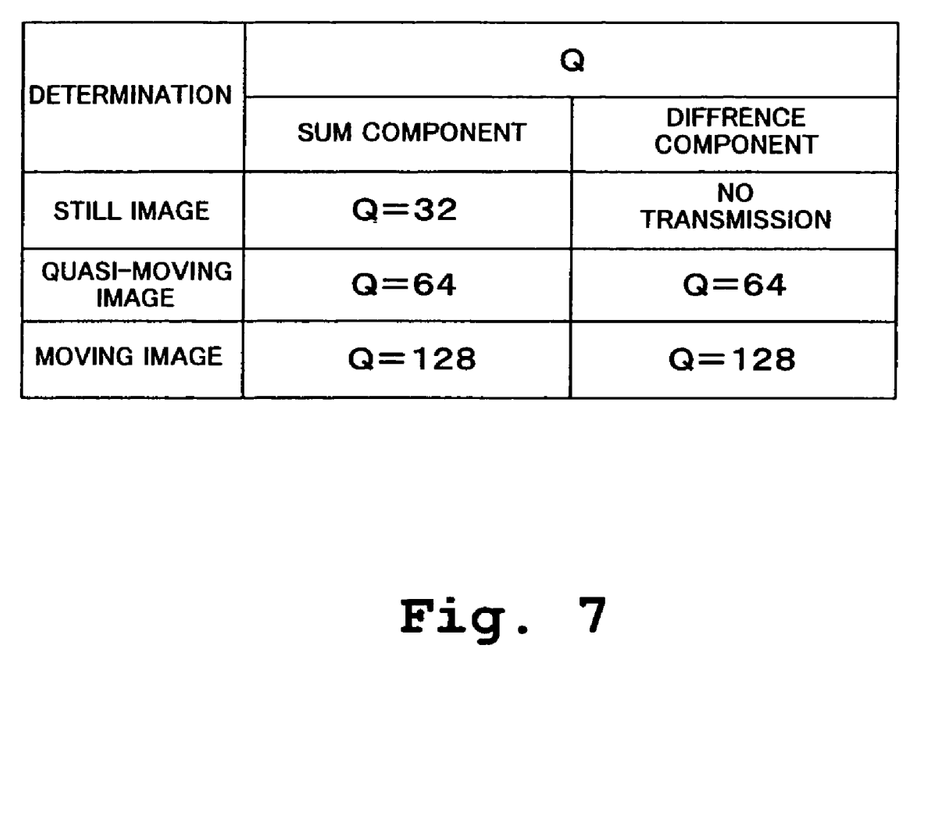
FIG. 7 is a diagram for describing a principle of changing a quantization step Q in the modification of the embodiment of the present invention.

The quantization units $1f$ and $1g$ perform quantization with the quantization step Q varied based on the determination result indicating a still, quasi-moving, or moving image. By way of example, the quantization step Q is set as shown in FIG. 7. For a still image, the sum component is quantized with the quantization step Q=32, and the difference component is not transmitted. For a quasi-moving image, the sum and difference components are both quantized with the quantization step Q=64. For a moving image, the sum and difference components are both quantized with the quantization step Q=128.

As described above, a decision as to whether or not to transmit the difference component is based on a determination as to whether or not the video image is a moving picture, and the quantization step Q is varied in accordance with the degree of change thereof, thereby maintaining an appropriate compression ratio based on changes in the video signal. Further, the scale and size of the circuit can be reduced, as compared with conventional encoding circuits.

What is claimed is:

1. An encoding circuit, comprising:
   a first Hadamard transform circuit for performing Hadamard transform on a block having "m" dots×"n" lines in a first frame;
   a second Hadamard transform circuit for performing Hadamard transform on a corresponding block having "m" dots×"n" lines in a subsequent second frame;
   means for calculating a sum component and a difference component for each component of a Hadamard transform result of the block in the first frame and a Hadamard transform result of the block in the second frame corresponding to the block in the first frame to perform three-dimensional Hadamard transform;
   motion detecting means for detecting whether or not the block includes a motion; and
   means for encoding the sum component and the difference component for the block when it is determined that the block includes a motion, and for encoding a motion detection result, instead of encoding the difference component, for the block determined when it is determined that the block includes no motion.

2. The encoding circuit according to claim 1, wherein the motion detecting means makes a determination regarding a motion in the block based on whether or not a difference between the sum or average value of pixel values in the block in the first frame and the sum or average value of pixel values in the block in the second frame corresponding to the block in the first frame lies within a predetermined range.

3. An encoding circuit for receiving a video signal for each frame in a time sequence, and compressing and supplying the video signal, comprising:
   a first Hadamard transform circuit for performing Hadamard transform on a block contained in a first frame;
   a second Hadamard transform circuit for performing Hadamard transform on a block contained in a second frame received prior to the first frame and corresponding to the block subjected to the process performed by the first Hadamard transform circuit;
   an adder for adding output values supplied from the first and second Hadamard transform circuits;
   a subtractor for performing subtraction on the output values supplied from the first and second Hadamard transform circuits;
   a motion detecting unit for detecting a change over time of the video signal of the block subjected to the process performed by the first Hadamard transform circuit; and
   an encoding unit for encoding a sum component from the adder and a difference component from the subtractor for the block when the motion detecting unit determines that the block includes a motion, and encoding a motion detection result, instead of the difference component, for the block when the motion detecting unit determines that the block includes no motion.

4. The encoding circuit according to claim 3, wherein the motion detecting unit detects a change in the video signal in the block based on whether or not a difference between a sum of characteristic values of pixels belonging to the block contained in the first frame and a sum of characteristic values of pixels belonging to the block contained in the second frame and corresponding to the block contained in the first frame lies within a predetermined range.

5. The encoding circuit according to claim 3, wherein the motion detecting unit detects a change in the video signal in the block based on whether or not a difference between an average of characteristic values of pixels belonging to the block contained in the first frame and an average of characteristic values of pixels belonging to the block contained in the second frame and corresponding to the block contained in the first frame lies within a predetermined range.

6. The encoding circuit according to claim 3, further comprising
   a quantizing unit for quantizing the sum component from the adder and the difference component from the subtractor, wherein
   the quantizing unit performs quantization by changing a quantization step in the quantizing unit based on the motion detection result obtained in the motion detecting unit.

7. The encoding circuit according to claim 4, further comprising
   a quantizing unit for quantizing the sum component from the adder and the difference component from the subtractor, wherein
   the quantizing unit performs quantization by changing a quantization step in the quantizing unit based on the motion detection result obtained in the motion detecting unit.

8. The encoding circuit according to claim 5, further comprising
   a quantizing unit for quantizing the sum component from the adder and the difference component from the subtractor, wherein
   the quantizing unit performs quantization by changing a quantization step in the quantizing unit based on the motion detection result obtained in the motion detecting unit.

* * * * *